United States Patent
Radnaev

(10) Patent No.: US 12,411,388 B2
(45) Date of Patent: Sep. 9, 2025

(54) QUANTUM-STATE READOUT USING STIMULATED EMISSIONS

(71) Applicant: ColdQuanta, Inc., Boulder, CO (US)

(72) Inventor: Alexander Georgiyevich Radnaev, Boulder, CO (US)

(73) Assignee: ColdQuanta, Inc., Boulder, CO (US)

( * ) Notice: Subject to any disclaimer, the term of this patent is extended or adjusted under 35 U.S.C. 154(b) by 249 days.

(21) Appl. No.: 18/200,531

(22) Filed: May 22, 2023

(65) Prior Publication Data

US 2023/0418128 A1 Dec. 28, 2023

Related U.S. Application Data

(63) Continuation of application No. PCT/US2021/061034, filed on Nov. 29, 2021, which is a continuation-in-part of application No. 17/499,999, filed on Oct. 13, 2021.

(60) Provisional application No. 63/119,728, filed on Dec. 1, 2020.

(51) Int. Cl.
   *G02F 3/00* (2006.01)
   *G02F 3/02* (2006.01)
   *G06N 10/40* (2022.01)

(52) U.S. Cl.
   CPC ............... *G02F 3/00* (2013.01); *G02F 3/02* (2013.01); *G06N 10/40* (2022.01)

(58) Field of Classification Search
   CPC ............ G02F 3/00; G02F 3/02; G06N 10/40
   See application file for complete search history.

(56) References Cited

U.S. PATENT DOCUMENTS

| | | |
|---|---|---|
| 10,504,033 B1 | 12/2019 | King |
| 2008/0231837 A1 | 9/2008 | Ichimura |
| 2015/0055961 A1 | 2/2015 | Meyers et al. |

(Continued)

FOREIGN PATENT DOCUMENTS

WO    2020068237 A1    4/2020

OTHER PUBLICATIONS

Dudin et al., Entanglement of a Photon and an Optical Lattice Spin Wave, PRL 103, 020505 (2009), week ending Jul. 10, 2009. 2009 The American Physical Society, pp. 020505-1-020505-4.

(Continued)

*Primary Examiner* — Hugh Maupin
(74) *Attorney, Agent, or Firm* — Michael J. Attisha; Samuel Means; Greenberg Traurig, LLP

(57) ABSTRACT

Quantum-state readout for an atom is performed using stimulated emission, e.g., by illuminating the atoms with electromagnetic radiation (EMR) with wavelengths selected to stimulate photon emission from the atom. Such an emission can be stimulated using four-wave mixing, in this case, three illumination wavelengths are mixed to stimulate the emissions wavelength. The illumination wavelengths are detuned from nearby resonant wavelengths to avoid capture by an atom orbital, which would lead to spontaneous rather than stimulated emission. The stimulated emissions are directional facilitating capture of a strong signal. The illumination wavelengths can be selected to be in different directions from the emissions wavelength to minimize noise in the emissions detection. The net result is a high-signal-to-noise ratio detection signal and quantum-state readout.

16 Claims, 5 Drawing Sheets

(56) References Cited

U.S. PATENT DOCUMENTS

| | | | |
|---|---|---|---|
| 2019/0164607 A1 | 5/2019 | Kaczmarek | |
| 2020/0185120 A1* | 6/2020 | Keesling Contreras | ..................... G21K 1/093 |
| 2020/0274703 A1 | 8/2020 | Lukens et al. | |
| 2022/0155621 A1* | 5/2022 | Miao | ..................... G02F 1/0344 |
| 2022/0171256 A1 | 6/2022 | Radnaev | |
| 2022/0365012 A1* | 11/2022 | Trautmann | ......... G01R 33/0041 |
| 2023/0314374 A1* | 10/2023 | Miao | ..................... G01N 27/82 702/38 |
| 2023/0341327 A1* | 10/2023 | Ebrahimi | ............... G01N 21/95 |

OTHER PUBLICATIONS

Jablonski, Energy Level Diagrams the Four Wave Mixing Process of Coherent anti Stokes, Mar. 2013.

Ketterle et al., High Densities of Cold Atoms in a Dark Spontaneous-Force Optical Trap, Physicals Review Letters, vol. 70, No. 15, Apr. 12, 1993, pp. 2253-2256.

Pritchard et al., Light Traps Using Spontaneous Forces, Physical Review Letters, vol. 57, No. 3, Jul. 21, 1986, 1986 The American Physical Society, pp. 310-313.

Radnaev et al., A Quantum Memory with Telecom-Wavelength Conversion, Nature Physics, Published Online, Sep. 26, 2010, vol. 6, Nov. 2010, pp. 894-899.

European Search Report in European International Application No. EP 21 90 1290 mailed Sep. 9, 2024.

\* cited by examiner

QUANTUM-STATE READOUT USING STIMULATED EMISSIONS

CROSS REFERENCE TO OTHER APPLICATIONS

This application is a continuation of PCT Application No. PCT/US21/61034 entitled QUANTUM-STATE READOUT USING STIMULATED EMISSIONS filed Nov. 29, 2021, which is a continuation in part of U.S. patent application Ser. No. 17/499,999 entitled QUANTUM-STATE READOUT USING FOUR-WAVE MIXING filed Oct. 13, 2021, which claims priority to U.S. Provisional Patent Application No. 63/119,728 entitled QUANTUM STATE READOUT AND IMAGING WITH FOUR-WAVE MIXING filed Dec. 1, 2020, all of which are incorporated herein by reference for all purposes.

U.S. patent application Ser. No. 17/499,999 entitled QUANTUM-STATE READOUT USING FOUR-WAVE MIXING filed Oct. 13, 2021, claims priority to U.S. Provisional Patent Application No. 63/119,728 entitled QUANTUM STATE READOUT AND IMAGING WITH FOUR-WAVE MIXING filed Dec. 1, 2020, which is incorporated herein by reference for all purposes.

BACKGROUND OF THE INVENTION

Whereas classical digital computers manipulate units, e.g., bits, of classical information, quantum computers manipulate units, e.g., qubits, of quantum information. Both classical bits and quantum qubits can be represented physically using two-state carriers. Examples of two-state quantum carriers include an electron that can assume a spin up and a spin down state, and an electron in an atom that can assume either of a ground state or an excited state. A classical two-state carrier assumes one of the two states at any given time; a quantum two-state carrier can be in a quantum superposition of both states simultaneously.

Once a quantum computation is complete, the results can be read out. Regardless of the underlying quantum technology (e.g., superconducting circuits, ions, cold-neutral atoms), superposition states collapse to non-superposition states on a probabilistic basis. In effect, qubits are reduced to bits. Thus, the objective is to determine the non-superposition state (i.e., eigenstate) of each quantum-state carrier.

For example, a cold-atom quantum array can be read out using fluorescence. Fluorescence can result when an electron in an excited state spontaneously emits a photon in the process of relaxing to a ground or at least a less excited state. To distinguish between atoms in a first quantum state representing (for example) a logic 1 from atoms in a second quantum state representing a logic 0, the atoms in an array can be illuminated with light selected to excite only the former to a fluorescence capable state. An image of the array can be formed as atoms in the fluorescence-capable state emit photons. The image then indicates which array positions held atoms representing logic 1 and which array positions did not. However, mis-readings can occur due to low signal-to-noise ratio in the images. What is needed is a readout approach that achieves a higher signal-to-noise ratio than existing quantum-state readout approaches.

DETAILED DESCRIPTION

The present invention provides for quantum-state readout using stimulated emissions of electromagnetic radiation (EMR), e.g., visible and near infrared light. Stimulated emissions tend to be highly directional, facilitating capture of a high percentage of emitted photons. The high percentage of captured emissions leads to strong emissions detection signals. In addition, illumination wavelengths and angles of incidence can be selected to facilitate spatial separation of the stimulating illumination from the stimulated emissions, leading to low noise captures. In combination, the high-percentage captures and the excellent rejection of illumination wavelengths provide for high signal-to-noise ratios and enhanced readout performance.

Herein, "stimulated emissions" are distinguished from "spontaneous emissions". Stimulated emissions occur contemporaneously with illumination so that conservation of momentum requires that the direction of emission is based on the directions of illumination. Spontaneous emissions occur after a random delay with respect to illumination so that conservation of momentum applies separately to illumination events and emissions events. As a result, emissions directions are independent of illumination directions and so can be in any direction. The omni-directionality of spontaneous emissions makes it difficult to capture large percentages of emissions, while the directionality of stimulated emissions enables high capture rates and the associated strong signals.

Emissions can be stimulated using a single photon or using multiple photons. In the latter case, the multiple photons can include photons of different directions and wavelengths. The invention also provides for emissions of different directions and wavelengths. The embodiment of FIG. 1, for example, uses stimulated-emissions four-wave mixing with three illumination wavelengths, each with a respective direction, and one emissions wavelength with a direction determined by the three illumination wavelengths.

Figure 1:
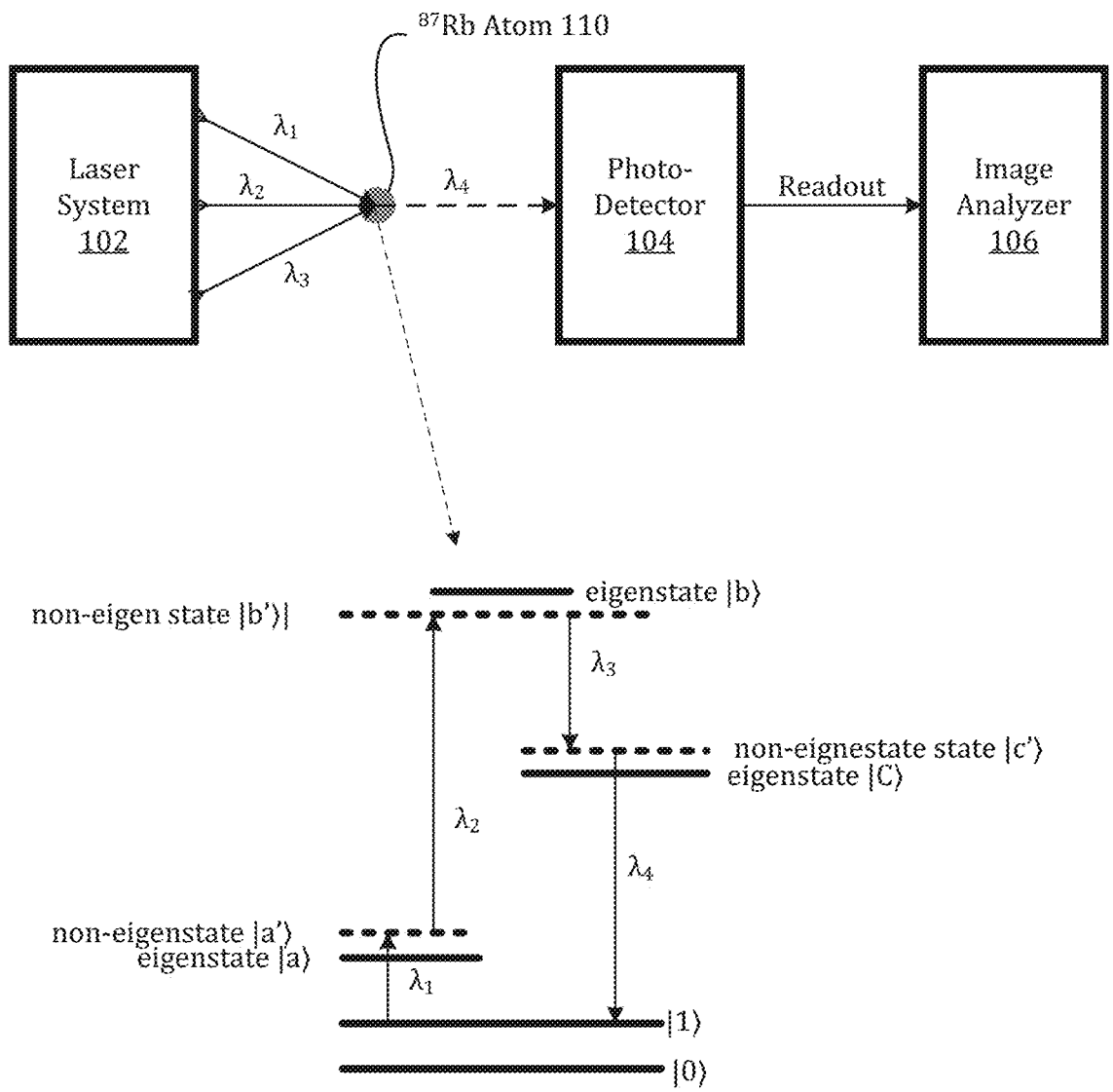
FIG. 1 is a schematic illustration of a quantum-state readout system based on stimulated emissions.

As shown in FIG. 1, quantum-state readout system 100 includes a laser system 102, a photodetector 104, and an image analyzer 106 to implement stimulated-emission four-wave mixing. The quantum-state carrier (QSC) to be read out is a system with non-linearity to support stimulated-emissions four wave mixing, for instance, a cold neutral rubidium 87 ($^{87}Rb$) atom 110. Atom 110 has a large number of eigenstate energy levels (aka "orbits") that its outer electron can occupy including: an eigenstate energy level |0⟩ used to represent a logic 0; an eigenstate energy level |1⟩ used to represent a logic 1; and reference eigenstate energy levels |a⟩, |b⟩ and |c⟩.

Laser system 102 outputs electro-magnetic radiation (EMR) with wavelengths $\lambda_1$, $\lambda_2$, and $\lambda_3$ toward atom 110 along respective directions. For expository purposes, EMR with wavelength $\lambda_1$ can be regarded as triggering an electron to transition up from eigenstate energy level |1⟩ to a non-eigenstate (non-orbit) energy level |a'⟩ that is off-resonant with respect to eigenstate |a⟩; wavelength $\lambda_2$ can be regarded as triggering an electron to transition up from non-eigenstate energy level |a'⟩ to a non-eigenstate level |b'⟩ that is off resonant with respect to an eigenstate energy level |b⟩; and wavelength $\lambda_3$ can be regarded as triggering an electron to transition down from non-eigenstate energy level |b'⟩ to a non-eigenstate energy level |c'⟩ that is off resonant with respect to eigenstate energy level |c⟩. Atom 110 "mixes" wavelengths $\lambda_1$, $\lambda_2$, and $\lambda_3$ to yield EMR of wavelength $\lambda_4=\lambda_1+\lambda_2-\lambda_3$, which is emitted in response to illumination of atom 110 by wavelengths $\lambda_1$, $\lambda_2$, and $\lambda_3$.

For an example with a rubidium 87 ($^{87}$Rb) atom, |0⟩=|5s1/2, F=2, m=0⟩, |1⟩=|5s1/2, F=1, m=0⟩, |a⟩=|5p3/2, F=2⟩, |b⟩=|6s1/2, F=1⟩, |c⟩=|5p1/2, F=2⟩. In the $^{87}$Rb, the detuning magnitudes are 41 Megahertz (MHz) for $\lambda_1$, 30 MHz for $\lambda_2$, and 6 MHz $\lambda_3$. These detunings correspond to wavelengths that are just a fraction of a nanometer; more specifically, they are in the range of 1-10 picometers. For an example with cesium 133 ($^{133}$Cs), |0⟩=|6s1/2, F=3, m=0⟩, |1⟩=|6s1/2, F=4, m=0⟩, |a⟩=|6p1/2, F=4⟩, |b⟩=|7s1/2, F=4⟩, |c⟩=|6p3/2, F=5⟩. The detunings depend on the atom and transitions of interest, but generally amount to a wavelength shift of less than in the picometer range (0.1 to 100 picometers).

Four-wave-mixing offers a rich variety of options, including choosing how close the illumination frequencies are to the atomic resonances so that emissions can be stimulated rather than spontaneous. Resonant illumination can result in spontaneous emissions instead of directional emissions. In the spontaneous case, illumination and emissions are decoupled so that conservation of momentum can result in recoils both during absorption of illumination and during emissions. The recoils can result in unwanted displacement and heating of atoms. In the regime where lasers are detuned from the resonances, the atom does not change state during four-wave mixing process and spontaneous emission is suppressed which beneficially reduces heating and can increase process efficiency. In the case of stimulated emissions, the fourth wave generation can be thought of as a result of mixing of induced oscillating atomic dipole moments by the three laser fields.

Alternatively, illumination wavelengths can be chosen to effect one or more transitions to allowed eigenstates/orbits from which spontaneous emissions can occur. Since the directions of spontaneous emissions are random, high capture rates and, thus, high signal-to-noise ratios can be difficult to achieve. On the other hand, using illumination wavelengths to avoid transitions to allowed eigenstates/orbits results in highly directional stimulated emissions, facilitating high-percentage photon captures and good spatial separation of emissions from illumination, and, thus, strong emissions detection signals.

Figure 2:
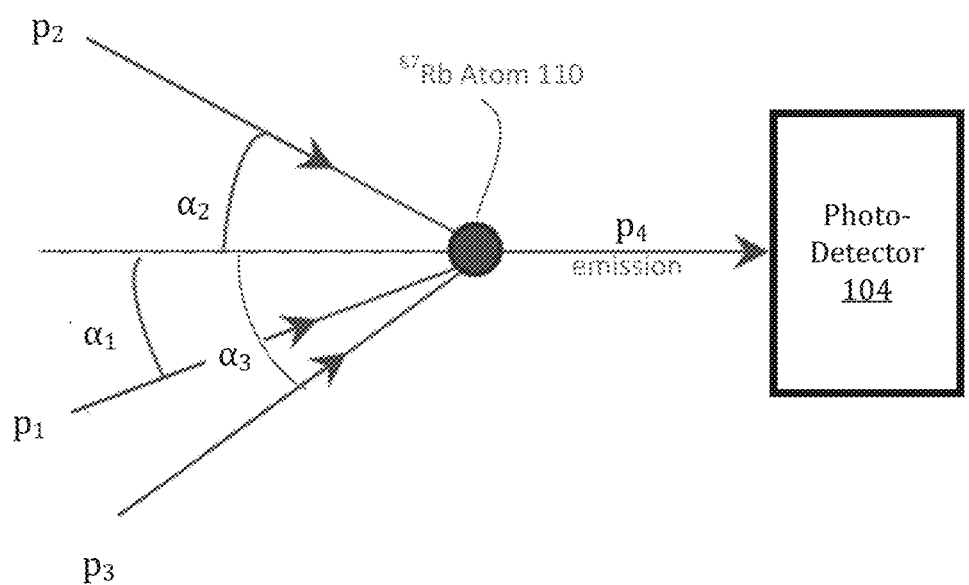
FIG. 2 is a schematic representation of an effect of conservation of momentum in the context of stimulated four-wave mixing readout.

Strong emissions-detection signals can be combined with low illumination noise detection levels. Low illumination-noise-detection levels can be achieved by selecting illumination directions that all differ from emissions directions. For an $^{87}$Rb example, the directions for illumination wavelengths $\lambda_1=780$ nanometers (nm), $\lambda_2=1367$ nm, $\lambda_3=1324$ nm, represented in FIG. 2 by their corresponding momentum vectors $\vec{p}_1$, $\vec{p}_2$, and $\vec{p}_3$, are each different from the direction of emissions wavelength $\lambda_4=455$ nm, which is represented in FIG. 2 by its momentum vector $\vec{p}_4$. The magnitude of momentum $\vec{p}_i \propto 1/\lambda_i$ (for i=1, 2, 3, 4) so the momentum is larger for shorter wavelengths. Assuming momentum is not lost or gained by the atom itself, the conservation of momentum requires $\vec{p}_4=\vec{p}_1+\vec{p}_2+\vec{p}_3$. For an $^{87}$Rb example, the respective angles of momentum vectors $\vec{p}_1$, $\vec{p}_1$, and $\vec{p}_1$ with respect to momentum vector $\vec{p}_4$ are: $\alpha_1=1.7°$, $\alpha_2=-0.55°$, and $\alpha_3=-2.25°$, sufficient to allow spatial filtering of illumination wavelengths $\lambda_1$, $\lambda_2$, and $\lambda_3$ from emissions wavelength $\lambda_4$. Of course, further reductions in illumination-detection noise can be achieved with spectral filtering. Combining strong signal detection with low illumination noise yields high signal-to-noise ratios.

Accordingly, photodetector 104 can be placed along the predetermined path for wavelength $\lambda_4$. In this position, photodetector 104 is out of the path of wavelengths $\lambda_1$, $\lambda_2$, and $\lambda_3$ so these illuminating wavelengths should contribute at most very little noise to the detection of wavelength $\lambda_4$. Further noise reduction can be achieved by using an infra-red (IR) rejecting filter 202 to spectrally filter out the near-infrared (700-1400 nm) illumination wavelengths: $\lambda_1=780$ nm, $\lambda_2=1367$ nm and $\lambda_3=1324$ nm, so that they do not reach photodetector 104. In other embodiments, other spectral and polarization filters can be used to reduce noise.

Accordingly, the stimulated-emissions four-wave-mixing readout method can produce substantially higher (10-100×) photon flux on the detector because four-wave mixing light is much more directed than fluorescence which is emitted in all directions. Typical practical imaging systems can collect only fraction of fluorescence light (~1-10%) due to limited collection solid angle. FWM light field solid angle is much smaller and hence can be fully captured by those imaging systems resulting in 10-100× higher photons detected and hence requiring 10-100× less time to detect the same number of photons.

Figure 3:
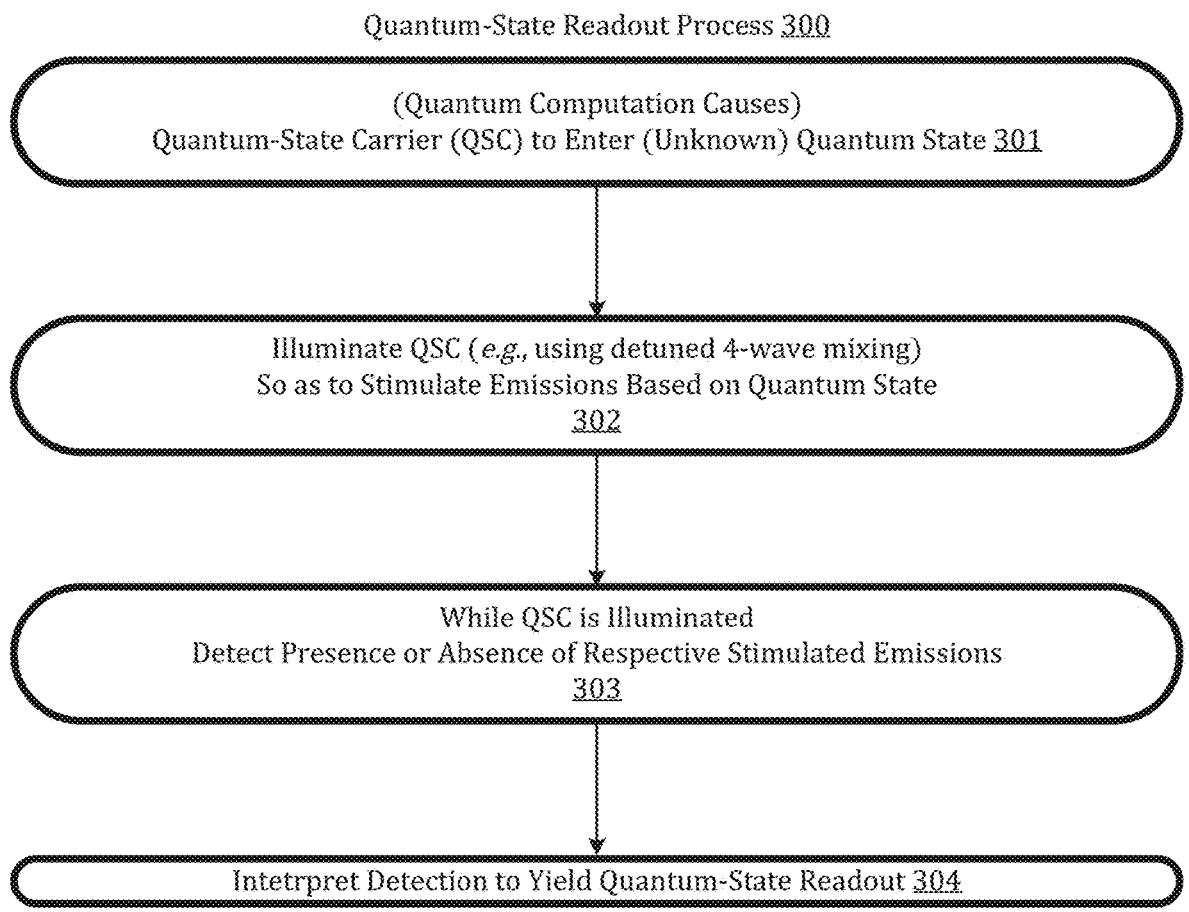
FIG. 3 is a flow chart of a quantum-state readout process implementable in the system of FIG. 1 and in other systems.

A quantum-state readout process 300, flow charted in FIG. 3, can be implemented in quantum-state readout system 100 and in other systems. At 301, a quantum computation or other process causes a quantum-state carrier (QSC) to enter a quantum state, typically an unknown superposition state. For example, quantum-state readout system 100 can serve as a quantum computer that generates a possible superposition quantum state.

In quantum computing, the quantum states of QSCs are manipulated as the QSCs are made to interact. Typically, the quantum-computation result is unknown before it is read out. The readout process causes superposition states to collapse so that what is read out are non-superposition QSC eigenstates, which represent classical realizations of quantum values. The superposition value resulting from a quantum computation can be approximated by repeating the quantum computation a large number of times to obtain a statistical distribution of readout results.

At 302, the QSC is illuminated, e.g., using laser light, with one or more sets of illumination wavelengths. During the illuminating, the QSC can switch from the superposition quantum state to the eigenstate. Quantum-state readout system 100 (FIG. 1) employs one set of three illumination wavelengths to positively detect one quantum eigenstate. As discussed further below, quantum-state readout systems 500 (FIG. 5) and 600 (FIG. 6) each employ two sets of three wavelengths to positively detect two different eigenstates. Additional illumination sets of three or more wavelengths can be used to positively distinguish three or more eigenstates.

The present invention provides for stimulated emissions using techniques other than four-wave mixing. For example, a single illumination wavelength can stimulate emissions in atoms prepared in an excited state. In what could have been called "three-wave mixing", a detuned two-photon transition can be used to stimulate emission of a third wavelength. Detuned n-wave stimulation with n≥5 can be achieved by substituting two or more photon transitions for a one-photon transition used in four-wave mixing. Any n-wave-mixing is possible as long as the system has a good nonlinearity to support the n process.

At 303, while the QSC is being illuminated, the presence or absence of respective emissions of an emissions wavelength can be detected (since stimulated emission are concurrent with illumination). One readout from one photodetector can indicate the presence or absence of one quantum state. One readout from each of two or more photodetectors can indicate the presence or absence of a like number of quantum states. The number of required photodetectors can be reduced by using bicolored or multi-colored detectors or by time-multiplexing a photodetector.

At 304, a quantum state readout is achieved based on the detections obtained at 303. In quantum-state readout system 100, image analyzer 106 analyzes the readouts of from photodetector 104 to determine the quantum state, as such and/or as a logic value represented by the quantum state. For example, the detected eigenstates of atoms can be determined and logic values can be determined from the energy levels. Alternatively, the quantum-states can be in the form of logic values without an intermediate determination of electron energy levels. In either case, the result of a quantum computation can have been determined.

Figure 4:
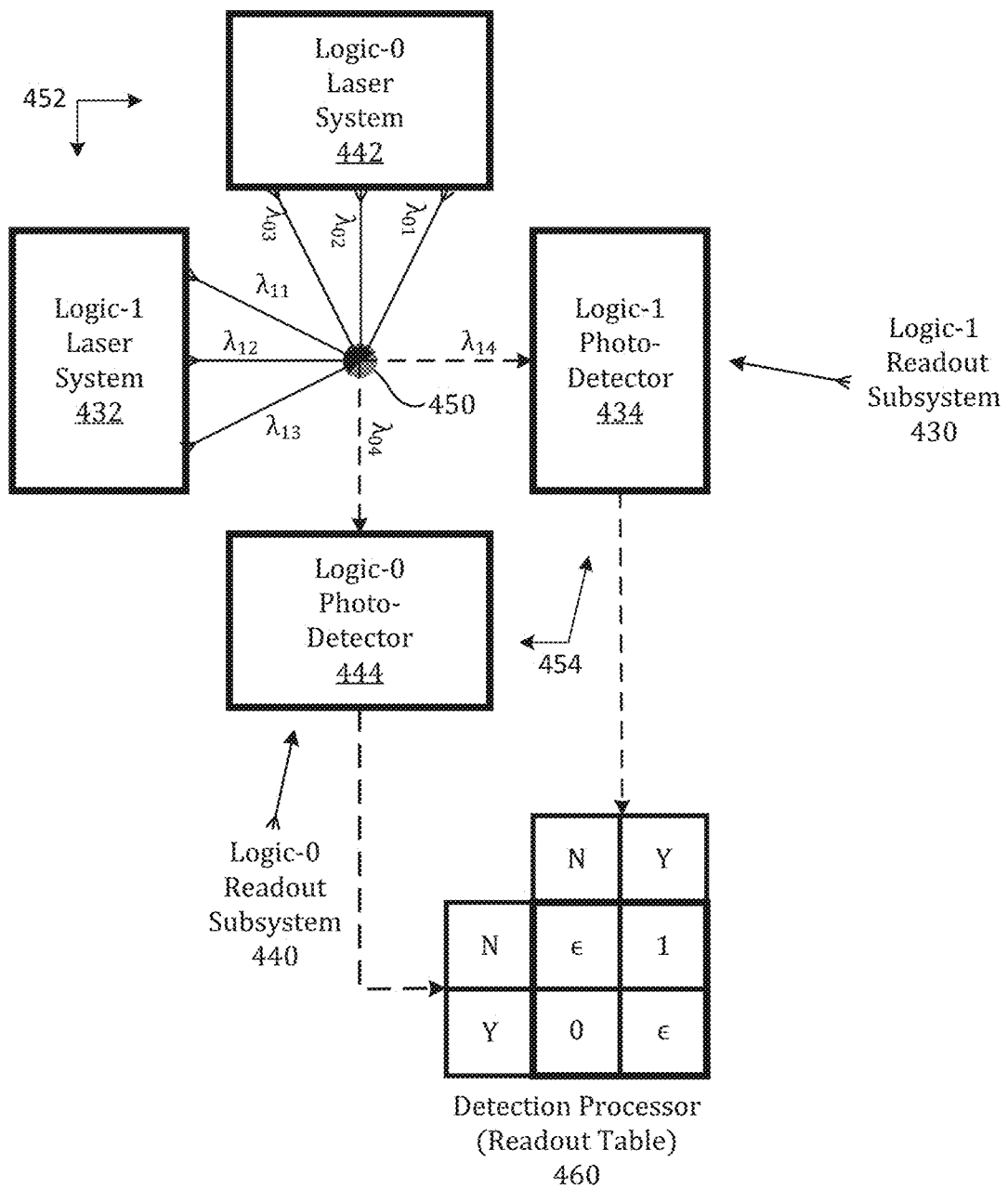
FIG. 4 is a schematic illustration of a quantum-state readout system using two stimulated four-wave mixing systems, one for each of two quantum states representing binary values.

In cold atom quantum computing, readout of atoms in respective quantum register sites is required. As there can be a large number of atoms, there is a risk that an atom will vacate its site. In view of this risk, it cannot be assumed that a site that does not have an atom in one state (e.g., a logic 1 state) must have an atom in another state (e.g., a logic-0 state). To address this risk, a quantum-state readout system 400, shown in FIG. 4, provides for positive/bright identifications of a first (e.g., logic 1) state and of a second state (e.g., logic-0 state) while a negative/dark (or double bright) detection indicates an error condition.

Quantum-state readout system 400 includes a logic-1 readout subsystem 430 and a logic-0 readout sub system 440 designed for reading out $^{87}$Rb atom 450. Logic-1 readout subsystem 430 includes a "logic-1" laser system 432 and a "logic-1" photodetector 434, while logic-0 readout subsystem 440 includes a "logic-0" laser system 442 and a "logic-0" photodetector 444. From a higher-level perspective, quantum-state readout system 400 includes a laser system 452, which includes laser systems 432 and 442, as well as a photodetector system 454, which includes photodetectors 434 and 444.

Logic-1 laser system 432 outputs wavelengths $\lambda_{11}$, $\lambda_{12}$, and $\lambda_{13}$. These wavelengths and their respective directions are chosen so that atom 450 will emit a wavelength $\lambda 1_4$ in a direction to be detectable by logic-1 photodetector 434 provided $^{87}$Rb atom 450 is in its logic-1 state. Logic 0 laser system 442 outputs wavelengths $\lambda_{01}$, $\lambda_{02}$, and $\lambda_{03}$. These wavelengths and their respective directions are chosen so that atom 450 will emit a wavelength $\lambda_{04}$ in a direction to be detectable by logic-0 photodetector 444 in an event that $^{87}$Rb atom 450 is in its logic-0 state.

Figure 5:
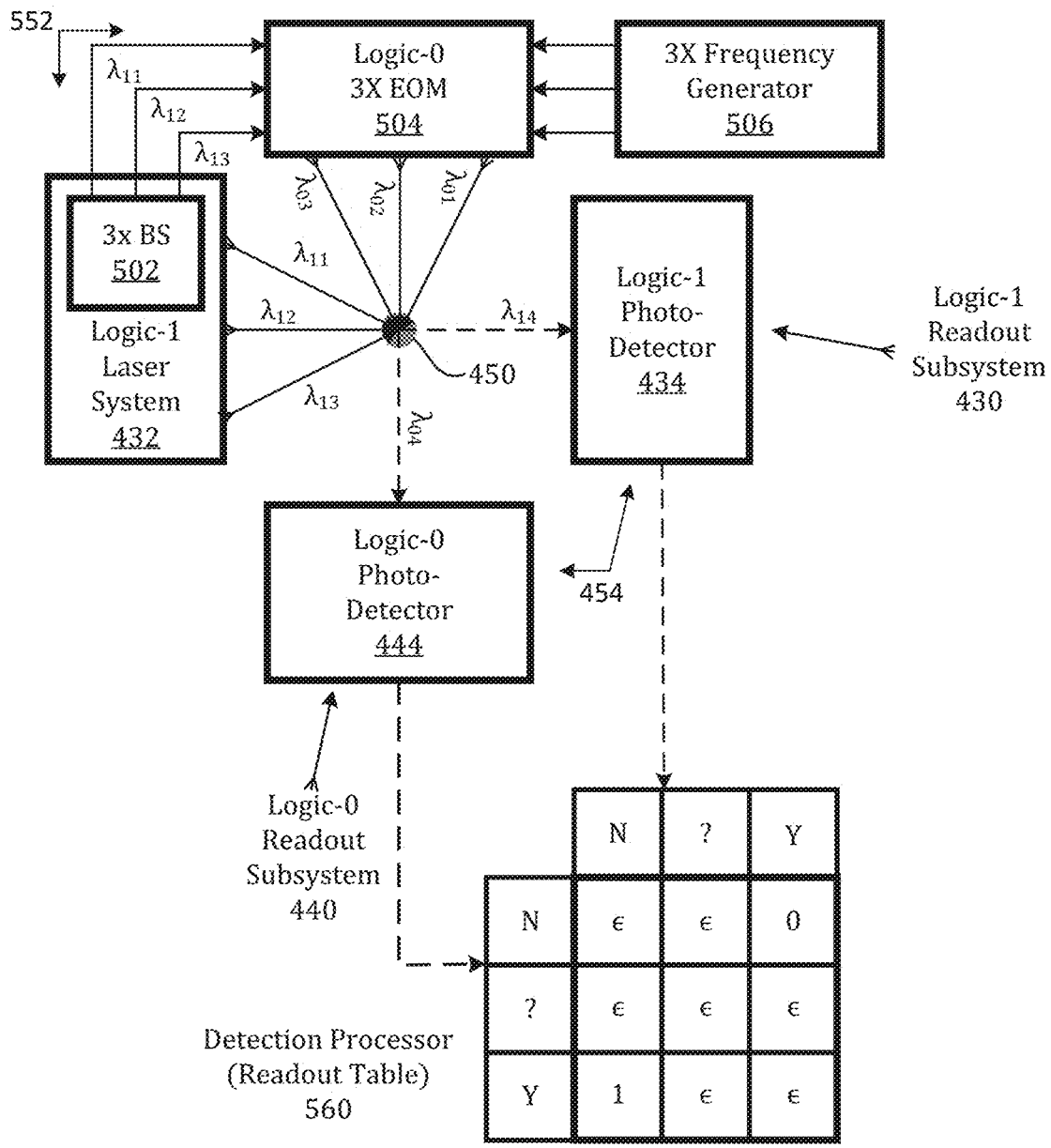
FIG. 5 is a schematic illustration of a quantum-state readout system using a dual stimulated four-wave mixing system providing for positive detection for each of two quantum states representing binary values.

The detection signals output by photodetectors 434 and 444 are transmitted to a detection processor, represented in FIG. 5 by a readout table 460. As indicated by table 460, detection from logic-1 photodetector 434 coupled with a non-detection from logic-0 photodetector 444 indicates that the $^{87}$Rb atom 450 was in its logic-1 state, e.g., representing a logic 1. A detection from logic-0 photodetector 544 coupled with a non-detection from logic-1 photodetector 434 indicates that $^{87}$Rb atom 450 was in its logic-0 state, e.g., representing a logic 0). Non-detections from both photodetectors 434 and 444 indicate an error e condition such as a missing atom. Affirmative detections from both photodetectors 434 and 444 also indicate an error condition. In case a series of atoms is to be interrogated, a binary string can be obtained to be interpreted according to context.

A quantum state readout system 500, shown in FIG. 5, is a variation on quantum-state readout system 400 but obviates the need for a separate laser system (e.g., logic-0 laser system 442 in FIG. 4) to handle a second state of interest. Logic-1 laser system 432 is modified to include three beam splitters 502, which provide copies of EMR with wavelengths $\lambda_{11}$, $\lambda_{12}$, and $\lambda_{13}$. These copies are input into a set of three respective electro-optical modulators 504 which shifts wavelengths $\lambda_{11}$, $\lambda_{12}$, and $\lambda_{13}$ by amounts determined by respective frequencies received by 3× frequency generator 506. This retuning results respectively in wavelengths $\lambda_{01}$, $\lambda_{02}$, and $\lambda_{03}$. System 500 employs a three-level readout table 560, taking into account a likelihood that some intermediate photodetection results may not qualify as a clear Yes (1) or No (0). As shown, all but two combinations of readouts represent error conditions. In other respects, system 500 is the same as system 400. Laser system 432, 3× EOM 504, and 3× frequency generator 506 can be seen as constituting a laser super-system 552.

Another quantum-state readout system, not illustrated herein, employs only one laser system and one photodetector. The laser system includes the 3× EOM and 3× frequency generator of system 500. In this embodiment, the frequency generator oscillates between two frequencies (or between off and on) so as to time multiplex the illumination and mixed wavelengths. The photodetector output is demultiplexed to separate readings for the different quantum states (e.g., logic-1 and logic-0).

Herein, a "quantum-state carrier" or "QSC" is any entity that can assume two or more quantum states including eigen states and superpositions of those eigen states. A QSC is capable of transitions between quantum states. Quantum states include eigenstates (e.g., stable states including those used to represent logic 0 and logic 1) and superpositions of eigenstates. Hyperfine levels, e.g., of a ground state, can be considered different quantum states. Examples of QSCs include charged and neutral molecular entities, superconducting electronic circuits, quantum dots, and nitrogen-vacancy centers in a diamond lattice. More specifically, neutral and charged rubidium, cesium, strontium, and yttrium atoms can serve as QSCs. Herein, "molecular entity" is used as defined in the International Union of Pure and Applied Chemistry (IUPAC) Goldbook to mean: "Any constitutionally or isotopically distinct atom, molecule, ion, ion pair, radical, radical ion, complex, conformer etc., identifiable as a separately distinguishable entity."

QSCs can represent units of quantum information, e.g., qubits and other qudits. (Herein, a "qubit" is a unit of quantum information that can be represented by complex values x meeting the criterion $x_R^2 + x_i^2 = 1$, where $x_R$ is the real component of x and $x_i$ is the imaginary component of x; a "qudit" is a value from a set of a positive integer number d of eigenstates and superpositions thereof.)

Herein, "electromagnetic radiation" (EMR) spans wavelengths from 1 picometer (pm) to 100 kilometers (km). The wavelengths of most interest for QSCs in the form of molecular entities are within the 100-10,000 nm range encompassing near ultraviolet (~300-~400 nm), visible (~400 nm-~700 nm), and near infrared light (~700-~1400 nm). Herein, an EMR wavelength is "resonant" for a QSC if it is capable of inducing a transition between eigenstates of the QSC. Herein, an EMR wavelength is "detuned" from a resonance wavelength" if it is not equal to the resonance wavelength but is within 1% of the resonance wavelength.

Herein, "cold" refers to temperatures below 1 millikelvin (1 mK), and "ultra-cold" characterizes particle temperatures below 100 μK (a typical Doppler cooling limit). Depending on the embodiment, the ultra-cold particles can further be below 100 nanoKelvin (nK). For example, in an exemplary BEC, the temperature can be about 50 nK. Herein, "ultra-high vacuum" and "UHV" refer to pressures below 10-9 Torr.

The invention is described in the context of using four-wave mixing in order to achieve stimulated emission. In some embodiments, other techniques may be used to achieve stimulated emission for performing quantum-state readout and/or for other purposes.

Herein, art labelled "prior art, if any, is admitted prior art; art not labelled "prior art", if any, is not admitted prior art. The illustrated embodiments, variations thereupon and modifications thereto are provided for by the present invention, the scope of which is defined by the following claims.

What is claimed is:

1. A method comprising:
    illuminating a quantum-state carrier (QSC) with electromagnetic radiation (EMR) comprising a plurality of illumination wavelengths including illumination wavelengths $\lambda_1$, $\lambda_2$ and $\lambda_3$, the EMR stimulating the QSC to emit EMR of an emissions wavelength $\lambda_4$, different from each of the illumination wavelengths $\lambda_1$, $\lambda_2$ and $\lambda_3$, in the event the QSC was in a first eigenstate during the illuminating;
    detecting whether or not EMR of the emissions wavelength $\lambda_4$ has been emitted from the QSC; and
    determining, based on the detection, whether or not the QSC was in the first eigenstate.

2. The method of claim 1 further comprising before the illuminating, causing the QSC to enter a superposition state, the QSC switching from the superposition state to the eigenstate during the illuminating.

3. The method of claim 1 wherein at least one of the illumination wavelengths is detuned from a resonance wavelength for the QSC.

4. The method of claim 1 wherein a direction of the emissions wavelength $\lambda_4$ is different from directions of each of the illumination wavelengths $\lambda_1$, $\lambda_2$ and $\lambda_3$.

5. The method of claim 1 wherein the illumination wavelengths $\lambda_1$, $\lambda_2$ and $\lambda_3$ are each detuned by an amount within the range of 0.1-100 picometers from a respective resonant wavelength for the QSC, and each illumination wavelength $\lambda_1$, $\lambda_2$ and $\lambda_3$ having a respective illumination direction different from a direction of the emissions EMR, the QSC being an atom, the wavelengths being within a range encompassing near-infrared and visible light.

6. The method of claim 1 wherein the emissions wavelength $\lambda_4 = \lambda_1 + \lambda_2 - \lambda_3$.

7. The method of claim 1 wherein the illumination wavelengths $\lambda_1$, $\lambda_2$ and $\lambda_3$ are each detuned by an amount within the range of 0.1-100 picometers from a respective resonant wavelength for the QSC.

8. The method of claim 1 wherein the QSC is an atom.

9. A quantum-state readout system comprising:
    an illumination system for illuminating a quantum-state carrier (QSC) with electromagnetic radiation (EMR) comprising a plurality of illumination wavelengths including illumination wavelengths $\lambda_1$, $\lambda_2$ and $\lambda_3$, the EMR stimulating the QSC to emit EMR of an emissions wavelength $\lambda_4$, different from each of the illumination wavelengths $\lambda_1$, $\lambda_2$ and $\lambda_3$, in the event the QSC was in a first eigenstate during the illuminating;
    a detector system for detecting whether or not EMR of the emissions wavelength $\lambda_4$ has been emitted from the QSC; and
    an analyzer for determining, based on the detection, whether or not the QSC was in the first eigenstate.

10. The quantum-state readout system of claim 9 further comprising a quantum-computer for causing the QSC to enter a superposition state, the QSC switching from the superposition state to the first eigenstate during the illuminating.

11. The quantum-state readout system of claim 9 wherein at least one of the wavelengths is detuned from a resonance wavelength for the QSC.

12. The quantum-state readout system of claim 9 wherein a direction of the emissions wavelength $\lambda_4$ is different from directions of each of the illumination wavelengths $\lambda_1$, $\lambda_2$ and $\lambda_3$.

13. The quantum-state readout system of claim 9 wherein the illumination wavelengths $\lambda_1$, $\lambda_2$ and $\lambda_3$ are each detuned by an amount within the range of 0.1-100 picometers from a respective resonant wavelength for QSC, and each illumination wavelength $\lambda_1$, $\lambda_2$ and $\lambda_3$ having a respective illumination direction different from a direction of the emissions EMR, the QSC being an atom, the wavelengths being within a range encompassing near-infrared and visible light.

14. The quantum-state readout system of claim 9 wherein the emissions wavelength $\lambda_4 = \lambda_1 + \lambda_2 - \lambda_3$.

15. The quantum-state readout system of claim 9 wherein the illumination wavelengths $\lambda_1$, $\lambda_2$ and $\lambda_3$ are each detuned by an amount within the range of 0.1-100 picometers from a respective resonant wavelength for the QSC.

16. The quantum-state readout system of claim 9 wherein the QSC is an atom.

* * * * *